United States Patent
Hasnain et al.

(10) Patent No.: US 10,439,655 B1
(45) Date of Patent: Oct. 8, 2019

(54) TRANSCEIVER FILTERS

(71) Applicant: Hewlett Packard Enterprise Development LP, Houston, TX (US)

(72) Inventors: Farhan Hasnain, Santa Clara, FL (US); Deven Patel, Santa Clara, FL (US); James Friedmann, Santa Clara, FL (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/938,109

(22) Filed: Mar. 28, 2018

(51) Int. Cl.
 *H04B 1/00* (2006.01)
 *H04W 88/06* (2009.01)
 *H04B 1/715* (2011.01)

(52) U.S. Cl.
 CPC ............ *H04B 1/005* (2013.01); *H04B 1/006* (2013.01); *H04B 1/0057* (2013.01); *H04B 1/0064* (2013.01); *H04B 1/715* (2013.01); *H04W 88/06* (2013.01); *H04B 2001/7154* (2013.01)

(58) Field of Classification Search
 CPC ........................................ H04B 1/005–1/0064
 See application file for complete search history.

(56) References Cited

U.S. PATENT DOCUMENTS

| | | | |
|---|---|---|---|
| 8,457,559 B2 | 6/2013 | Gao et al. | |
| 8,594,056 B2 | 11/2013 | Rick et al. | |
| 8,874,034 B2 | 10/2014 | Walley et al. | |
| 9,048,944 B2 | 6/2015 | Boes | |
| 9,295,075 B2 | 3/2016 | Wyper et al. | |
| 9,681,382 B2 | 6/2017 | Zhang et al. | |
| 2002/0037742 A1* | 3/2002 | Enderlein | H04B 1/005 455/552.1 |
| 2005/0048927 A1* | 3/2005 | Kemmochi | H01P 1/15 455/78 |
| 2005/0227631 A1* | 10/2005 | Robinett | H04B 1/006 455/83 |
| 2007/0238425 A1* | 10/2007 | McFarland | H04B 1/18 455/133 |
| 2008/0045152 A1 | 2/2008 | Boes | |
| 2009/0190633 A1 | 7/2009 | Smith | |
| 2010/0048240 A1* | 2/2010 | Yanduru | H04B 1/0078 455/553.1 |
| 2011/0116490 A1 | 5/2011 | Wilhelmsson et al. | |

(Continued)

FOREIGN PATENT DOCUMENTS

CN 105939163 9/2016

OTHER PUBLICATIONS

Wojtiuk, J., Bluetooth and WiFi Integration: Solving Co-existence Challenges, (Research Paper), Oct. 1, 2004, 6 Pgs.

(Continued)

*Primary Examiner* — Tuan A Tran
(74) *Attorney, Agent, or Firm* — Brooks, Cameron & Huebsch, PLLC (57) ABSTRACT

An example may include access point, comprising: a processing resource; a first radio transceiver; a first radio frequency (RF) sub-band filter on the first radio transceiver; a second radio transceiver; a second RF sub-band filter, complementary to the first RF sub-band filter, on the second radio transceiver; and instructions executable by the processing resource to enable and disable the first RF sub-band filter and the second RF sub-band filter based on a network metric.

14 Claims, 4 Drawing Sheets

(56) References Cited

U.S. PATENT DOCUMENTS

| | | | |
|---|---|---|---|
| 2012/0108174 A1 | 5/2012 | Gao et al. | |
| 2012/0286893 A1* | 11/2012 | Vogas | H03H 9/0542 |
| | | | 333/101 |
| 2013/0043946 A1* | 2/2013 | Hadjichristos | H04B 1/0057 |
| | | | 330/252 |
| 2016/0006556 A1* | 1/2016 | Pehlke | H04B 1/0057 |
| | | | 370/280 |
| 2016/0227604 A1* | 8/2016 | Amini | H04B 1/0057 |

OTHER PUBLICATIONS

European Search Report and Search Opinion Received for EP Application No. 19165710.5, dated May 29, 2019, 19 pages.

\* cited by examiner

TRANSCEIVER FILTERS

BACKGROUND

An access point (AP) may be a networking device connected to a wired network. The AP may be utilized to form a wireless network, such as a wireless local area network (WLAN), by allowing client devices to wirelessly connect to the wired network through the AP. For example, the AP may operate as a transmitter and/or receiver of wireless radio signals between the AP and the client device. An AP may include radio transceivers and antennas to transmit and receive the radio signals.

DETAILED DESCRIPTION

As used herein, Access Points (AP) may include network devices that operate as a transmitter and/or receiver of wireless radio signals for any known or convenient wireless access technology which may later become known. While the term AP may include network devices that transmit and/or receive IEEE 802.11-based Wi-Fi signals, AP is not intended to be limited to IEEE 802.11-based APs. APs may generally function as an electronic device that is adapted to allow wireless devices to connect to a wired network via various communications standards. An AP can include a processing resource, memory, and/or input/output interfaces, including wired network interfaces such as IEEE 802.3 Ethernet interfaces, as well as wireless network interfaces such as IEEE 802.11 Wi-Fi interfaces and/or 802.15 interfaces, although examples of the disclosure are not limited to such interfaces. An AP can include a memory resource, including read-write memory, and a hierarchy of persistent memory such as ROM, EPROM, and Flash memory.

An AP may include a plurality of radio transceivers and/or radio antennas to transmit and receive various radio signals. For example, an AP may include a first radio transceiver and/or a first antenna that may be a wireless local area network (WLAN) Wi-Fi radio that may be utilized to transmit and/or receive a Wi-Fi (IEEE 802.11) radio signal. The AP may also include an 802.15 second radio transceiver and/or a second antenna that may be a utilized to transmit and/or receive a radio signal from various 802.15 technologies such as Bluetooth, Bluetooth Low Energy (BLE), ZigBee, Thread, 6LoWPAN, WirelessHART, ISA100.11a, Coexistence, High Rate WPAN, Low Rate WPAN, mesh Networking, Body area Networks, Visible Light Communication, etc. For example, the second radio transceiver and/or second antenna may be a IEEE 802.15.1/4 radio utilized to transmit and/or receive a IEEE 802.15.1/4 signal. In another example, the second radio transceiver and/or second antenna may include a Low Power Wide Area Network (LP-WAN) radio transceiver utilized to transmit and/or receive a ZigBee radio signal (IEEE 802.15.4).

In an example, the Wi-Fi radio and the IEEE 802.15.1/4 radio in the AP may both operate on the same unlicensed 2.4 GHz radio frequency band. Some applications, such as indoor locating and/or asset tracking may include scanning, with a IEEE 802.15.1/4 radio on specific channels, to detect IEEE 802.15.1/4 signal beacons transmitted from a IEEE 802.15.1/4 location puck or IEEE 802.15.1/4 tag on a tracked asset. For example, the IEEE 802.15.1/4 radio may scan for IEEE 802.15.1/4 beacons on advertising channels 37 (2402 MHz), 38 (2426 MHz), and 39 (2480 MHz), among others, in the 2.4 GHz ISM band.

The Wi-Fi radio in the AP may transmit the Wi-Fi radio signal on data channels 1 (2412 MHz), 6 (2437 MHz), or 11 (2460 MHz), among others, in the 2.4 GHz ISM band. However, the proximity of the Wi-Fi radio and the IEEE 802.15.1/4 radio in the same AP may strain the utilization of the radio spectrum. For example, while the Wi-Fi radio in the AP is transmitting on any one of Wi-Fi data channels, the IEEE 802.15.1/4 radio in the AP is not able to receive beacons on its advertising channels. In an example, the Wi-Fi radio may create on-channel interference with the IEEE 802.15.1/4 radio. For example, energy skirts coming from Wi-Fi radio signal transmissions may interfere with and even prevent the IEEE 802.15.1/4 advertising channels from being utilized by the IEEE 802.15.1/4 radio transceiver. Additionally, the Wi-Fi radio signal transmission within its data channel may include a high level of radio frequency energy (e.g., 28 dBm, 18 dBm, etc.). The radio frequency energy may be so high that, even though it is not transmitting on an IEEE 802.15.1/4 advertising channel, it substantially jams the IEEE 802.15.1/4 radio transceiver from transmitting and/or receiving IEEE 802.15.1/4 signals on the jammed channels. The combination of low noise amplifier jamming and on-channel interference may render the IEEE 802.15.1/4 radio channels saturated to the point that the IEEE 802.15.1/4 radio is unable to receive and/or detect IEEE 802.15.1/4 beacons at the AP while the Wi-Fi radio is transmitting.

Failing to receive and/or detect the IEEE 802.15.1/4 beacons at the AP may degrade the capability of the AP to track assets. For example, a IEEE 802.15.1/4 tracking tag may periodically and briefly emit a chirp including a IEEE 802.15.1/4 radio signal beacon. The AP may identify the location of the asset upon receiving and/or detecting the IEEE 802.15.1/4 beacon. As described above, when the Wi-Fi radio is transmitting, the AP may not receive a IEEE 802.15.1/4 beacon. As such, Wi-Fi transmissions may interrupt and/or prohibit the tracking utilizing IEEE 802.15.1/4 beacons until a time that the Wi-Fi transmission in the AP is suspended. That is, a IEEE 802.15.1/4 radio may miss IEEE 802.15.1/4 beacons when the Wi-Fi radio of the AP is transmitting. As such, the IEEE 802.15.1/4 radio may be relegated to scanning for IEEE 802.15.1/4 chirps during intermissions in the Wi-Fi radio signal transmission. As a result, an AP may not be able to track assets utilizing IEEE 802.15.1/4 beacons in substantially real time and/or constantly since the AP may lose tracked assets utilizing IEEE 802.15.1/4 beacons during Wi-Fi transmissions. In these situations, the AP may be forced to wait until a time that the Wi-Fi transmitter is not transmitting, a time that the IEEE 802.15.1/4 radio is scanning, and a time that the IEEE 802.15.1/4 tag is chirping occur simultaneously.

In contrast, examples of the present disclosure may include access points, machine-readable medium, and methods for transceiver filtering. The examples of the present disclosure may utilize complementary radio frequency (RF) sub-band filters. The examples of the present disclosure may enable simultaneous transmission at the first radio transceiver of the AP and reception at the second radio transceiver of the AP. For example, an access point may include a first radio transceiver, a first RF sub-band filter on the first radio transceiver, a second radio transceiver, a second RF sub-band filter, complementary to the first RF sub-band filter, on the second radio transceiver, and instructions executable by a processing resource to enable and disable the first RF sub-band filter and the second RF sub-band filter based on a network metric.

Figure 1A:
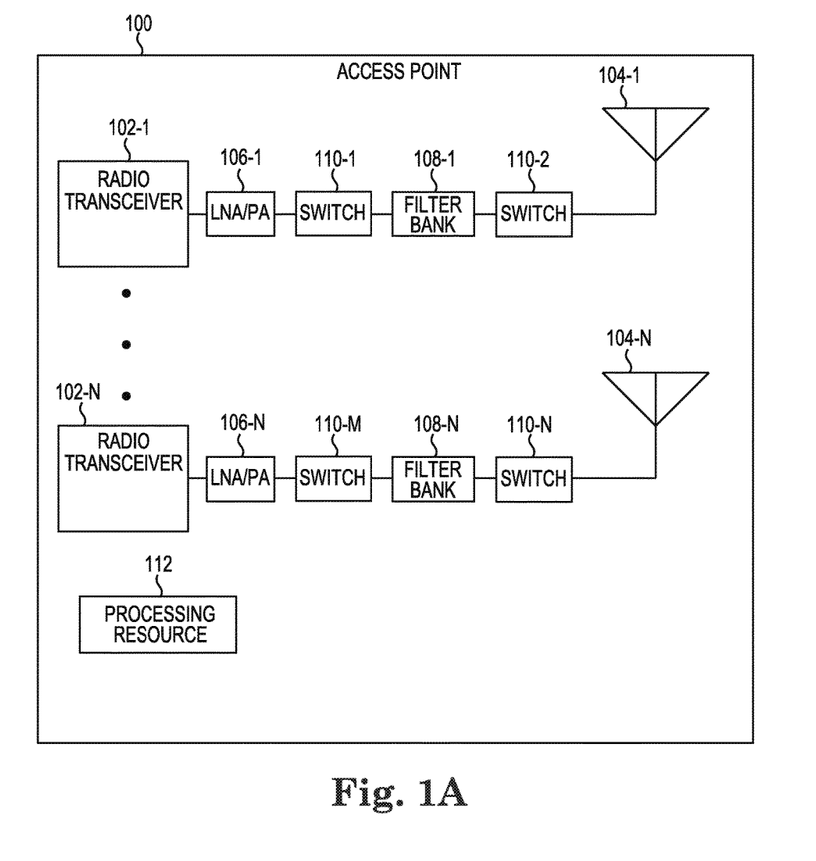
FIG. 1A illustrates an example of an access point including transceiver filters consistent with the disclosure.

FIG. 1A illustrates an access point (AP) 100 including transceiver filter banks 108-1 . . . 108-N, consistent with the disclosure. The AP 100 may include a network device that has a wired connection to a computing network (e.g., LAN, Internet, etc.). The AP 100 may act as a wireless connection point for client devices. As used herein, the term "client device" can, for example, refer to a device including a processing resource, memory, and input/output interfaces for wired and/or wireless communication. For example, a client device may include a laptop computer, a desktop computer, a mobile device, an Internet-of-Things device and/or other wireless devices, although examples of the disclosure are not limited to such devices. A mobile device may, for example, refer to devices that are (or may be) carried and/or worn by a user. For instance, a mobile device can be a phone (e.g., a smart phone), a tablet, a personal digital assistant (PDA), smart glasses, and/or a wrist-worn device (e.g., a smart watch), among other types of mobile devices.

The AP 100 may operate as a wireless connection point between the client device and the wired network by sending radio signals to and receiving radio signals from a client device that is in communication with the AP 100. The AP 100 may include radio transceivers 102-1 . . . 102-N that transmit and/or receive the radio signals utilized in communicating with the client devices. As used herein, a radio transceiver may include a component that modulates the property of energy produced to impress a signal upon it. The radio transceiver may receive radio wave signal input and coverts it to a form that is usable for the AP, such as digital information.

The AP 100 may include radio antennas 104-1 . . . 104-N. As used herein, a radio antenna 104-1 . . . 104-N may include a component that coverts electrical currents, produced by a corresponding radio transceiver, into radio waves in order to transmit the waves. Additionally, the radio antenna 104-1 . . . 104-N may convert received radio waves into electric current to pass to the corresponding radio transceiver. In some examples, each of the radio transceivers 102-1 . . . 102-N may include and/or be connected to its own physically distinct radio antenna 104-1 . . . 104-N.

The AP 100 may include a plurality of radio transceivers 102-1 . . . 102-N along with a plurality of corresponding radio antennas 104-1 . . . 104-N. In some examples, different ones of the plurality of radio transceivers 102-1 . . . 102-N and their corresponding radio antennas 104-1 . . . 104-N may be dedicated to distinct functions and/or be distinct types. For example, some of the plurality of radio transceivers 102-1 . . . 102-N and their corresponding radio antennas 104-1 . . . 104-N may be dedicated to transmitting and/or receiving a particular type of radio signal, a radio signal with a particular purpose, and/or a radio signal that complies with a particular technical standard variant, while others of the plurality of radio transceivers 102-1 . . . 102-N and their corresponding radio antennas 104-1 . . . 104-N may be dedicated to transmitting and/or receiving a different type of radio signal, with a different purpose, and that complies with a different technical standard variant.

In an example, the AP 100 may include a first radio transceiver 102-1 and a corresponding first antenna 104-1. The first radio transceiver 102-1 may be configured to transmit and/or receiver a first radio signal. For example, the first radio transceiver 102-1 may be a Wi-Fi transceiver. The first radio transceiver 102-1 may be utilized to establish a WLAN with client devices based on the IEEE 802.11 standards. The first radio transceiver 102-1 may utilize the 2.4 GHz ultra-high frequency ISM radio bands to transmit and/or receive Wi-Fi radio signals. The first radio transceiver 102-1 may transmit and/or receive radio signals on a plurality of channels. For example, the first radio transceiver 102-1 may transmit and/or receive on channel 1, where channel 1 is centered on the 2412 MHz radio frequency. The first radio transceiver 102-1 may also transmit and/or receive on channel 6, where channel 6 is centered on the 2437 MHz radio frequency. Additionally, the first radio transceiver 102-1 may also transmit and/or receive on channel 11, where channel 11 is centered on the 2460 MHz radio frequency. The first radio transceiver 102-1 may transmit on a plurality of data channels that are not listed in the specific example given above, but that are common data channels utilized for Wi-Fi radio signal transmission and/or reception by Wi-Fi radio transceivers.

The AP 100 may include a low-noise amplifiers (LNA) and/or a power amplifiers (PA) 106-1 . . . 106-N. A first LNA/PA 106-1 may include an electronic amplifier that amplifies a low-power signal from the first radio transceiver 102-1 without substantially degrading the signals signal-to-noise ratio en route from or to the first antenna 104-1. A second LNA/PA 106-N may include an electronic amplifier that amplifies a low-power signal from the first radio transceiver 102-1 without substantially degrading the signals signal-to-noise ratio en route from or to the first antenna 104-1. However, in some examples the first radio transceiver 102-1 and/or the second radio transceiver 102-N may not include a respective LNA/PA.

The LNAs/PAs 106-1 . . . 106-N may amplify the amount of radio energy associated with a signal. For example, the first LNA/PA 106 may facilitate the first radio transceiver 102-1 transmitting a radio signal at relatively high energy level (e.g., ~16 dBm-~30 dBm) from the first antenna 104-1.

The AP 100 may include a second radio transceiver 102-N and a corresponding second antenna 104-N. The second radio transceiver 102-N may be configured to transmit and/or receive a second radio signal. The second radio signal may be a radio signal that is a different type from the first radio signal. For example, the second radio signal may comply with a different technical standard or technical standard variant than the first radio signal. In an example, the second radio signal may be a radio signal from the various 802.15 technical standard variants, such as Bluetooth, Bluetooth Low Energy (BLE), ZigBee, Thread, 6LoWPAN, WirelessHART, ISA100.11a, Coexistence, High Rate WPAN, Low Rate WPAN, mesh Networking, Body area Networks, Visible Light Communication, etc. For example, the second radio transceiver 102-N may be a IEEE 802.15.1/4 transceiver that may be utilized to transmit and/or receive a IEEE 802.15.1/4 signal. In another example, the second transceiver 102-N may include a Low Power Wide Area Network (LP-WAN radio utilized transceiver to broadcast a ZigBee radio signal (IEEE 802.15.4).

The second radio transceiver 102-N may transmit and/or receive on a plurality of different channels. For example, where the second transceiver 102-N is a IEEE 802.15.1/4 transceiver, the second transceiver 102-N may transmit and/or receive on channel 37 that is centered on the 2402 MHz radio frequency. The second transceiver 102-N may also transmit and/or receive on channel 38 that is centered on the 2426 MHz radio frequency. Additionally, the second transceiver 102-N may transmit and/or receive on channel 39 that is centered on the 2480 MHz radio frequency. The second radio transceiver 102-N may transmit on a plurality of data channels that are not listed in the specific example given above, but that are common data channels utilized for receiving and/or transmitting the corresponding 802.15.4 technical standard variant radio signal.

As described above, the first radio transceiver 102-1 may performing a radio signal transmit operation. A radio signal transmit operation may include generating a radio signal and/or causing the radio signal, such as the first radio signal, to be transmitted from an antenna, such as the first antenna 104-1. For example, a radio signal transmit operation may include the first radio transceiver 102-1 generating a Wi-Fi radio signal and causing the Wi-Fi radio signal to be transmitted on one of the Wi-Fi data channels. However, while the first radio transceiver 102-1 is performing a radio signal transmit operation with a first radio signal, a second radio signal receive operation of the second radio transceiver 102-N may be prevented. A radio signal receive operation may include receiving and/or detecting a radio signal, such as the second radio signal, at a radio transceiver, such as the second radio transceiver 102-N. Again, when the first radio transceiver 102-1 is transmitting a first radio signal, the second radio transceiver 102-N may be prevented from receiving and/or detecting a second radio signal that the second radio transceiver 102-N is meant to receive. For example, where the second radio transceiver 102-N is a IEEE 802.15.1/4 transceiver, the second radio transceiver 102-N may be prevented from receiving and/or detecting a IEEE 802.15.1/4 signal that is transmitted to the second antenna 104-N for asset tracking purposes by the AP while the first radio transceiver 102-1 is transmitting a Wi-Fi radio signal.

The second radio transceiver 102-N may be prevented from receiving the second radio signal because of interference on the channels that the second radio transceiver utilized to receive such second radio signals. In some examples, the source of the interference may be the first radio signals transmitted from the first radio transceiver 102-1. For example, the first radio signals may prevent the receiving operation of the second radio transceiver 102-N through a combination of jamming and on-channel interference with the channels utilized by the second radio transceiver 102-N to receiver such second radio signals.

For example, the LNA/PA 106 may amplify the signal transmitted from the first radio transceiver 102-1 to a relatively high level of raw radio frequency energy, as described above. In some examples, the proximity of the first radio transceiver 102-1 to the second radio transceiver 102-N and/or the first antenna 104-1 to the second antenna 104-N may be such that the raw radio frequency energy output from the LNA/PA 106 substantially saturates the second radio transceiver 102-N. In a substantially saturated state, the second radio transceiver 102-N may be rendered unable to receive and/or detect its corresponding second radio signal.

In another example, the first radio signals transmitted by the first radio transceiver 102-1 may be centered on the particular frequency, but each signal may not have sharp energy boundaries that fully restrict the radio energy within the confines of a radio frequency bandwidth of a particular data channel. Instead, the first radio signals may include energy skirts where the radio energy may be dissipating, but still may bleed outside the precise confines of a particular radio frequency bandwidth of a data channel. These energy skirts of the radio signals may bleed into channels being utilized by the second radio transceiver 102-N to receive second radio signals thereby generating on-channel interference with receiving channels for the second radio signal. For example, where the first radio transceiver 102-1 is transmitting and/or receiving on a data channel centered at 2480 MHz and the second radio transceiver 102-N is receiving on an advertising channel centered at 2460 MHz, the radio frequency energy of the transmission centered at 2480 MHz may not be completely confined within the 20 MHz radio frequency margin between the two. As a result, the energy skirt from the first radio transceiver 102-1 transmission may bleed over into and interfere with the reception and/or detection of radio signals at the second radio transceiver 102-N.

The on-channel interference and the jamming may result in disruption of receiving and/or detecting of second radio signals by the second radio transceiver 102-N while the first radio transceiver 102-1 is transmitting the first radio signals. In some examples, the second radio transceiver 102-N may be a IEEE 802.15.1/4 radio transceiver that is utilized by the AP for indoor locating and/or asset tracking. The IEEE 802.15.1/4 radio transceiver may perform indoor locating and/or asset tracking by detecting chirps of IEEE 802.15.1/4 beacons from IEEE 802.15.1/4 asset tags or pucks. Although these examples are discussed with relation to IEEE 802.15.1/4 transceiver radios and IEEE 802.15.1/4 beacons, this disclosure is not so limited, and it is appreciated that any of the above-described radio and/or radio signal combinations may be utilized in a similar fashion. With the second radio transceiver 102-N prevented from receiving a second radio signal utilized in tracking or locating assets during a period of time when the first radio transceiver 102-1 is transmitting a first signal, substantially real-time and constant asset locating or tracking is prevented. In some examples, when the period of time that the tracking tag or puck chirps a beacon signal overlaps with the period of time that the first radio transceiver 102-1 is transmitting, the beacon may be entirely missed. When the beacon chirp is missed the AP 100 may not be able to perform tracking or locating operations until such time that the beacon chirp occurs again during a period when the first radio transceiver is not transmitting. As such, the resolution of asset tracking and locating under such interfering conditions may be coarse grained and/or unreliable without any attenuation of the interference.

However, the AP 100 may include a plurality of filter banks 108-1 . . . 108-N. For example, a first filter bank 108-1 may be included that is connected between the first transceiver radio 102-1 and the first antenna 104-1. The first filter bank 108-1 may include a single filter. In such examples, however, a filter bank with a single filter may not include switches 110-1 . . . 110-N. However, in some examples, the first filter bank 108-1 may include a plurality of filters. That is, although FIG. 1 illustrates the first filter bank 108-1 as a single box, the first filter bank 108-1 may also include a plurality of filters arranged as a bank of filters. The first filter bank 108-1 may include a bank of switchable filters. Switchable filters may include individual filters that may be switched between (e.g., activated, deactivated, etc.) by switches 110-1 . . . 110-N such as switches 110-1 and 110-2.

In some examples, the first filter bank 108-1 may include a bank of switchable filters including a plurality of RF sub-band filters that are individually tuned to distinct portions of the radio frequency. The RF sub-band filters may include a plurality of bandpass filters that separate an input signal into multiple signal components, each signal component carrying a sub-band of the original input signal. An RF sub-band filter may pass a first portion of a frequency band of a signal and attenuate a second portion of the frequency band of the signal. For example, an input signal may include energy from a portion of the radio frequency band. A RF sub-band filter may filter out a part, or a sub-band, of that portion of the radio frequency band. Each of a plurality of RF sub-band filters may filter out different parts of the portion of the radio frequency band of the input signal. In some examples, the plurality of RF sub-band RF sub-band filters may include a plurality of bandpass filters including a full-band filter. A full band filter may allow the entire first portion of the radio frequency band of the input signal pass through unfiltered. That is, while the RF sub-band filters may separate the full frequency band of the signal into component sub-band parts, the full band filter may leave the fill frequency band of the signal intact and/or not separated.

In examples where the first transceiver radio 102-1 is a Wi-Fi transceiver radio, the first filter bank 108-1 may include a bank of switchable filters that include three bandpass filters on the 2.4 GHz Wi-Fi transceiver that are controlled (e.g., enabled, disabled, etc.) by two single pole 3 throw (SP3T) switches. The three bandpass filters may include: a first bandpass filter for Wi-Fi channels 1 and 6 described above; a second bandpass filter for Wi-Fi channel 11 described above; and a third full-band filter for all the Wi-Fi data channels that may be utilized by an unfiltered Wi-Fi radio transceiver.

The switches 110-1 and 110-2 may be utilized to select which of the switchable filters is active and/or not active. The AP 100 may include a processing resource 112. The processing resource 112 may execute actions and/or functions, etc., described herein. The AP 100 may include a combination of logic and machine-readable instructions stored on a machine-readable media to cause a processing resource to perform actions and/or functions associated with complementary filtering. As used herein, "logic" may be an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in a memory and executable by a processor. It is presumed that logic similarly executes instructions for purposes of the embodiments of the present disclosure. In some examples, the processing resource 112-N may include a controller. The processing resource 112-N may include a plurality of general-purpose input/output (GPIO) pins. The switches 110-1 and 110-2 may themselves be controlled by two GOPI pins on the processing resource 112-N.

A second filter bank 108-N may be included that is connected between the second transceiver radio 102-N and the second antenna 104-N. The second filter bank 108-N may include a single filter. In such examples, however, a filter bank with a single filter may not include switches 110-1 . . . 110-N. However, in some examples, the second filter bank 108-N may include a bank of a plurality of filters. That is, although FIG. 1 illustrates the second filter bank 108-N as a single box, the second filter bank 108-N may include a plurality of filters and/or a through path arranged as a bank of filters. The second filter bank 108-N may include a bank of switchable filters and/or a through path. Switchable filters may include individual filters that may be switched between (e.g., enabled, disabled, etc.) by switches 110-1 . . . 110-N such as switches 110-M and 110-N. The switches 110-M and 110-N may be further controller by two GPIOs. In some examples, the two GPIOs may be located on a chip set of the second radio transceiver 102-N.

In some examples, the second filter bank 108-N may include, in addition to a through path for all channels, a plurality of RF sub-band filters that are tuned to distinct portions of the radio frequency. For example, the plurality of RF sub-band filters may include a plurality of receive-side bandpass filters. In an example, the plurality of switchable filters may include a first band pass filter for the lower portion (e.g., ~2414 MHz for IEEE 802.15.1/4 radio transceivers) of the radio spectrum utilized by the second transceiver radio 102-N, a band pass filter for the upper portion (e.g., ~2480 MHz for IEEE 802.15.1/4 radio transceivers) of the radio spectrum utilized by the second transceiver radio 102-N, and a through path for the entire radio spectrum utilized by the second transceiver radio 102-N.

The filters of the second filter bank 108-N may be complementary to the filters of the first filter bank 108-1. For example, each switchable filter in the bank of switchable filters of the first filter bank 108-1 may have a complementary counterpart switchable filter in the bank of switchable filters of the second filter bank 108-N. As used herein, complementary filters may include a pair of filters, one as a transmit-side filter on the first radio transceiver 102-1 and one as a receive-side filter on the second radio transceiver 102-N. The complementary filters may be paired such the transmit side filter member of the pair attenuates the on-channel interference from the first radio transceiver 102-1 by acting as a bandpass filter for a data channel or data channels utilized to transmit the first radio signal by first radio transceiver 102-1. The data channel or channels utilize by the first radio transceiver may include data channels that are substantially isolated, with regard to the MHz radio frequency band utilized, from a portion of the radio frequency band that the second radio transceiver 102-N will utilize to receive the second radio signal. Further, the complementary filters may be paired such that the receive-side filter member of the pair attenuates the jamming effect. The receive side filter may attenuate the jamming effect by acting as a bandpass filter for the portion of the radio frequency band that is substantially isolated from the channel or channels utilized for transmission by first radio transceiver 102-1.

Revisiting the examples where the first transceiver radio 102-1 is a Wi-Fi transceiver radio, the first filter bank 108-1 may include a bank of switchable filters that includes a first bandpass filter for Wi-Fi channels 1 (centered on 2412 MHz) and 6 (centered on 2437 MHz), a second bandpass filter for Wi-Fi channel 11 (centered on 2460 MHz), and a third full-band filter for all the Wi-Fi channels available to an unfiltered Wi-Fi radio transceiver. In examples where the second transceiver radio 102-N is a IEEE 802.15.1/4 radio, a first band pass filter, of the second filter bank 108-N, for the upper portion (e.g., ~2480 MHz) of the radio spectrum utilized by the second transceiver radio 102-N may be complementary to the first bandpass filter, of the first filter bank 108-1, for Wi-Fi channels 1 (centered on 2412 MHz) and 6 (centered on 2437 MHz). For example, the first bandpass filter, of the first filter bank 108-1, for Wi-Fi channels 1 (centered on 2412 MHz) and 6 (centered on 2437 MHz) may restrict the Wi-Fi radio to transmitting on channels 1 (centered on 2412 MHz) and 6 (centered on 2437 MHz) while the first band pass filter, of the second filter bank 108-N, for the upper portion (e.g., ~2480 MHz) of the radio spectrum utilized by the second transceiver radio 102-N may restrict the IEEE 802.15.1/4 radio to receiving IEEE 802.15.1/4 signals on channel 39 (centered on 2480 MHz).

In some examples, the second radio transceiver 102-N is a IEEE 802.15.1/4 radio transceiver and a second band pass filter, of the second filter bank 108-N, for the lower portion (e.g., ~2414 MHz) of the radio spectrum may be utilized by the second radio transceiver 102-N. The second bandpass filter, of the second filter bank 108-N, may be complementary to a second bandpass filter, of the first filter bank 108-1 for Wi-Fi channel 11 (centered on 2460 MHz). For example, the second bandpass filter, of the first filter bank 108-N, for Wi-Fi channel 11 (centered on 2460 MHz) may restrict the Wi-Fi radio to transmitting on channels 1 (centered on 2412 MHz) and 6 (centered on 2437 MHz) while the second band pass filter, of filter bank 108-N, for the lower portion (e.g., ~2414 MHz) of the IEEE 802.15.1/4 radio may restrict the IEEE 802.15.1/4 radio transceiver to receiving IEEE 802.15.1/4 signals on channel 37 (centered on 2402 MHz) and channel 38 (centered on 2426 MHz).

In some examples, the second transceiver radio 102-N is an IEEE 802.15.1/4 radio transceiver and a through path for substantially all IEEE 802.15.1/4 advertising channels available to be utilized by an unfiltered IEEE 802.15.1/4 radio transceiver may be complementary to the full-band filter for a substantial number of Wi-Fi channels available to be utilized by an unfiltered Wi-Fi radio transceiver. That is, the through path for a substantial number of the IEEE 802.15.1/4 advertising channels on the receive-side and the full-band filter on the transmit-side for a substantial number of Wi-Fi channels may be complementary even though they do not perform a complementary filtering that attenuates jamming and/or on-channel interference. Instead, activating the through path for a substantial number of IEEE 802.15.1/4 channels on the receive-side and the full-band filter on the transmit-side for a substantial number of Wi-Fi channels may result in the above describe jamming and on-channel interference with the second radio transceiver 102-N while the first radio transceiver 102-1 is transmitting.

In an example, activating the first bandpass filter, of the first filter bank 108-1, for Wi-Fi channels 1 (centered on 2412 MHz) and 6 (centered on 2437 MHz) may provide approximately 30 dB rejection, or more, at the upper portion of the IEEE 802.15.1/4 radio frequency band. As such, the first bandpass filter, of the first filter bank 108-1, may reduce the noise floor coming from the energy skirt of radio signals transmitted on channels 1 and 6 of the first radio transceiver 102-1 and the on-channel interference on the receive-side channels of the second radio transceiver 102-N. As a result of activating the first bandpass filter, of the first filter bank 108-1, may filter the sensitivity of the second radio transceiver 102-N may improve by ~25 dB, thereby attenuating on-channel interference. Activating the first band pass filter, of second filter bank 108-N, for the upper portion (e.g., ~2480 MHz) of the radio spectrum utilized by the second transceiver radio 102-N may provide approximately 30 dB, or more, rejection at Channels 1 and 6. As a result of activating the first bandpass filter, of the second filter bank 108-N, the raw 2.4 GHz energy level coming from transmissions on channels 1 and 6 may be reduced providing an improvement of ~40 dB to the sensitivity of the second radio transceiver 102-N, thereby attenuating the jamming effect of transmissions from the first radio transceiver 102-1 on the second radio transceiver 102-N.

Further, when data channel 1 (centered on 2412 MHz) Wi-Fi is being utilized to transmit by the first radio transceiver 102-1 in a 20 MHz wide channel bandwidth, activating the first bandpass filter, of the first filter bank 108-1, for channel 1 transmission and complementary first bandpass filter of filter bank 108-N for channel 39 (centered on 2480 MHz) may attenuate Wi-Fi jamming and on-channel interference at the same time. Such a filtering scheme may assume a ~25-30 dB first antenna 104-1 and second antenna 104-N rejection.

Two complementary filters of first filter bank 108-1 and second filter bank 108-N, respectively, with the stated antenna isolation, may bring the sensitivity of the second radio transceiver 102-N back to a baseline sensitivity allowing the second radio transceiver 102-N to receive and/or detect the corresponding appropriate second radio signals even while the first radio transceiver 102-1 is transmitting a first radio signal. Activation of these two complementary filters may attenuate interference back to a baseline on more than ten data channels in addition to advertising channel 39. For example, when a Wi-Fi radio transceiver is transmitting on channel 1 or 6 with the two complementary filters activated, the receive sensitivity of IEEE 802.15.1/4 radio transceiver may be improved to −80 dBm or better on channel 39 and channels 26-36.

Similar results may be achieved by activating the second bandpass filter, of the first filter bank 108-1, for Wi-Fi channel 11 (centered on 2460 MHz) utilized by the first transceiver radio 102-1 along with the second bandpass filter of the second filter bank 108-N for the lower portion (e.g., ~2414 MHz) of the radio spectrum utilized by the second transceiver radio 102-N. For example, activation of both of these complementary bandpass filters may attenuate the interference back to baseline on more than seventeen data channels in addition to advertising channels 37 and 38. For example, when a Wi-Fi radio transceiver is transmitting on channel 11 with the two complementary filters activated, the receive sensitivity of the IEEE 802.15.1/4 radio transceiver may be improved to −80 dBm or better on channels 37-38, channels 0-10 and channels 11-16.

As illustrated in the examples above, activating complementary pairs of filters, such as complementary filters from the first filter bank 108-1 and the second filter bank 108-N, that filter out jamming and on-channel interference from the first radio transceiver 102-1 that would otherwise prevent the second radio transceiver 102-N from receiving and/or detecting a signal that the second radio transceiver 102-N is configured to detect, such as Bluetooth, Bluetooth Low Energy (BLE), ZigBee, Thread, 6LoWPAN, WirelessHART, ISA100.11a, Coexistence, High Rate WPAN, Low Rate WPAN, mesh Networking, Body area Networks, Visible Light Communication, etc. radio signals. However, the increased availability of the second radio transceiver 102-N to receive and/or detect corresponding appropriate radio signals may impose a performance cost on the AP 100. For example, utilizing the above described complementary filters may prevent the first radio transceiver 102-1 from transmitting and/or receiving on the channels that are filtered out by the activated filter of the first filter bank 108-1. Likewise, the complementary filters may prevent the second radio transceiver 102-N from transmitting and/or receiving on the channels that are filtered out by the activated filter of the second filter bank 108-N. That is, the first radio transceiver 102-1 and/or the second radio transceiver 102-N are prevented from transmitting on, scanning on, and/or receiving on their full complement of channels in order to institute the dual complementary filter arrangement described herein. In some examples, this may affect the overall performance of the AP 100 by limiting the ability of the AP 100, when a given pair of complementary filters is activated, to receive and/or detect radio signals intended for the AP 100 that are transmitted on the channels that are being filtered out.

There may be instances where the degraded performance of the AP 100 resulting from attenuating the interference with the complementary filter banks 108-1 and 108-N is not desired, such as in instances where the radio signals received by the second transceiver radio 102-N are not present or are a lower priority than the performance of the first transceiver radio 102-1. As such, utilizing the switchable filter banks 108-1 and 108-N as described herein may provide flexibility in activating and deactivating particular complementary filter pairs and/or through paths/full-band filters. The switches 110-1 . . . 110-N switching between the filters in the switchable filter banks 108-1 and 108-N may allow the AP 100 to transition between modes of operation. Examples of the modes of operation may t may include an unfiltered mode and a plurality of complementarily filtered modes. The complementary filtered modes may be individually biased to particular transmitting and/or receiving channels of the first radio transceiver 102-1 and/or the second radio transceiver 102-N.

As described above, the AP 100 may include a processing resource 112. The processing resource 112 may execute instructions to control switches 110-1 . . . 110-N and/or to selectively switch between switchable filters in the first switchable filter bank 108-1 and a second switchable filter bank 108-N. For example, the processing resource 112 may execute instructions to enable and/or disable, based on a network metric, a first RF sub-band filter that is connected to a first radio transceiver 102-1 and a second RF sub-band filter, complementary to the first RF sub-band RF sub-band filter, that is connected to a second radio transceiver 102-N.

A network metric may include a metric of performance conditions at the AP 100 and/or at other network devices in a network that the AP 100 is connected to. Examples of a network metric may include a network availability metric, a network utilization metric, a network latency metric, a service level agreement metric, a network jitter metric, a packet loss metric, a throughput per access point metric, network capacity metric, network capacity consumption metric, throughput per network metric, throughput per client device metric, transmission rates metrics, etc. In some examples, the network metric may also include conditions such as a channel that a first radio transceiver 102-1 of an AP 100 and/or a second radio transceiver 102-N of the same AP 100 is assigned or scheduled to transmit and/or receive on by a network controller. The network metric may include conditions such as a channel that the first radio transceiver 102-1 of an AP 100 and/or the second radio transceiver 102-N of the AP 100 are transmitting and/or receiving on with a greatest frequently. The network metric may include conditions such as a channel that a first radio transceiver 102-1 of other APs in the network and/or a second radio transceiver 102-N of the other APs in the network are assigned or scheduled to transmit and/or receive on by a network controller.

The network metric may include a determination of whether a second radio transceiver 102-N is being utilized. For example, whether the second radio transceiver 102-N of the AP 100 is being utilized to track an asset utilizing radio signals specific to the second radio transceiver 102-N. The determination of utilization may be done by detecting the radio signals specific to the second radio transceiver 102-N at the second radio transceiver 102-N, for example, when the first radio transceiver 102-1 is not transmitting and/or during a periodic scheduled activation of the complementary filters in filter banks 108-1 . . . 108-N. Alternatively, the determination of utilization may be a setting that is able to be toggled by a user and/or a network administrator to specify that the second radio transceiver 102-N is to be utilized to detect the radio signals utilizing the complementary filters in filter banks 108-1 . . . 108-N persistently and/or when other network metrics or network metric estimates demonstrate such operation would increase network performance metrics. Additionally, network metrics may include a determination of whether adjacent (in physical proximity of APs, in physical proximity of coverage area, and/or in overlapping coverage areas) APs may be being utilized or not being utilized to track an asset utilizing radio signals specific to the second radio transceiver 102-N.

As described above, utilizing the complementary filters in filter banks 108-1 . . . 108-N described herein may result in a degraded ability to transmit and/or receive on one or more data channel at the first radio transceiver 102-1 and/or the second radio transceiver 102-N in order to attenuate interference on the channels that are utilized under such a filtration mechanism. As such, the processing resource 112 may execute instructions to analyze the network metrics to analyze and/or predict the effect enabling or disabling a complementary filter pairs in filter banks 108-1 . . . 108-N, generally or specific pairs within switched banks of filters, will have on the performance of the AP 100 and/or the performance of the network that the AP 100 is connected to. For example, the processing resource 112 may execute instructions to predict how enabling or disabling particular complementary filter pairs in the switched bank of filters will effect network metrics. If the effects on network metrics would cause a network metric to fall below a threshold level the subject complementary filter pair may not be switched from or to. The processing resource 112 may execute instructions to determine a balanced approach that allows for a greatest amount of time operating with a particular enabled complementary filter pair and a greatest average network metric. The processing resource 112 may execute instructions to identify redundancies in network coverage for particular radio signals that may permit a particular AP to operate with enabled complementary filter pairs in the switched bank of filters without bringing an analyzed network metric below a particular threshold amount.

The processing resource 112 may execute instructions to switch and/or schedule the switching between complementary filter pairs in the bank of switchable filters. The decision to switch may be based on the above-described network metrics and/or the analysis thereof. The decision to switch may be a decision that causes certain network metrics to decrease such as those metrics reflecting the ability to transmit and/or receive on certain channels by the first radio transceiver 102-1 and/or the second radio transceiver 102-N that are filtered out by enabling some complementary filter pairs. However, the interference on the remaining channels may be attenuated and simultaneous transmission from the first radio transceiver 102-1 and reception by the second radio transceiver 102-N of corresponding radio signals may be enabled.

As such, switching may include switching the AP 100 into a mode whereby substantially real time, live, and/or constant tracking utilizing the second radio signal corresponding to the second radio transceiver 102-N is activated. The substantially real time, live, and/or constant tracking may occur despite the tracking occurring on the remaining unfiltered channels and not on the filtered out channels previously accessible by the second radio transceiver 102-N. As such, some particular chirps of the second radio signal corresponding to the second radio transceiver 102-N sent to the radio transceiver 102-N on the channels that are filtered out by the enabled complementary filter pairs may be missed by the AP 100. However, as long as the scanning of the remaining unfiltered channels scanned by the second radio transceiver 102-N is substantially constant, the overall possibility of detecting chirps from the device may be increased. Further, as described above the first radio transceiver 102-1 may be assigned to transmit on a particular channel. As long as the enabled complementary filter pair does not prevent transmitting on that same assigned channel, then such a complementary filter pair may create a net positive result of strong transmission of a first radio signal from the first radio transceiver 102-1 with a simultaneous substantially constant receiving and/or detecting of a second radio signal from the second radio transceiver 102-N.

The AP 100 is not intended to be limited to a particular example described herein. The AP 100 may include additional features and/or more perform additional operations such as those features and/or operations described with regard to the access point described in FIG. 1B, the machine-readable medium described in FIG. 2 and the method 340 described in FIG. 3.

Figure 1B:
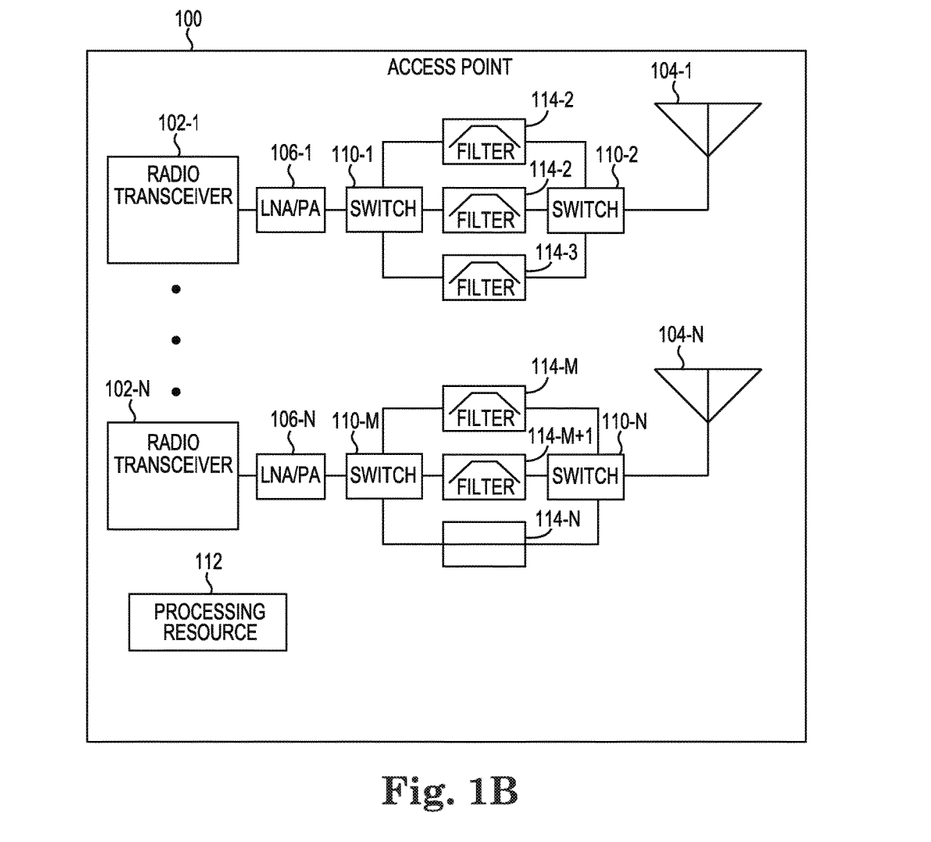
FIG. 1B illustrates an example of an access point including transceiver filters consistent with the disclosure.

FIG. 1B illustrates an access point (AP) 100 including switchable filters 114-1 . . . 114-N, consistent with the disclosure. As described above, the first filter bank 108-1 and the second filter bank 108-N in FIG. 1A may each be a bank of switchable filters 114-1 . . . 114-N. FIG. 1B illustrates the banks of switchable filters 114-1 . . . 114-N on the radio transceivers 102-1 . . . 102-N. The first switchable filter 114-1 for the first radio transceiver 102-1 may include a RF sub-band filter that acts as a bandpass filter for a first portion of data channels that the first radio transceiver 102-1 may utilize to transmit a first radio signal. For example, the first switchable filter 114-1 on a Wi-Fi radio transceiver may include a RF sub-band filter that acts as a bandpass filter for Wi-Fi data channels 1 and 6.

The second switchable filter 114-2 for the first radio transceiver 102-1 may include a RF sub-band filter that acts as a bandpass filter for a second portion of data channels that the first radio transceiver 102-1 may utilize to transmit a first radio signal. For example, the second switchable filter 114-2 on a Wi-Fi radio transceiver may include a RF sub-band filter that acts as a bandpass filter for Wi-Fi data channel 11.

The third switchable filter 114-3 for the first radio transceiver 102-1 may include a full-band filter that does not prevent the first radio transceiver 102-1 from transmitting on data channels assigned for transmitting a first radio signal. For example, the third switchable filter 114-3 on a Wi-Fi radio transceiver may include a full-band filter that does not prevent the Wi-Fi radio from transmitting a Wi-Fi radio signal on any particular Wi-Fi data channels.

The first switchable filter 114-M for the second radio transceiver 102-N may include a RF sub-band filter that acts as a bandpass filter for a first portion of data channels that the second radio transceiver 102-1 may utilize to transmit a second radio signal. For example, the first switchable filter 114-M on a IEEE 802.15.1/4 radio transceiver may include a RF sub-band filter that acts as a bandpass filter for IEEE 802.15.1/4 data channels on a lower portion of the IEEE 802.15.1/4 RF band.

The second switchable filter 114-M+1 for the second radio transceiver 102-N may include a RF sub-band filter that acts as a bandpass filter for a second portion of data channels that the second radio transceiver 102-N may utilize to transmit a second radio signal. For example, the second switchable filter 114-M+1 on a IEEE 802.15.1/4 radio transceiver may include a RF sub-band filter that acts as a bandpass filter for IEEE 802.15.1/4 data channels on an upper portion of the IEEE 802.15.1/4 RF band.

The third switchable filter 114-N for the second radio transceiver 102-N may include a through path for the second radio transceiver 102-N that does not prevent the second radio transceiver 102-N from transmitting on data channels assigned for transmitting a second radio signal. For example, the third switchable filter 114-N on an IEEE 802.15.1/4 radio transceiver may include a through path for IEEE 802.15.1/4 data channels on both the upper and the lower portion of the IEEE 802.15.1/4 RF band.

In FIG. 1B, the first switchable filter 114-1 for the first radio transceiver 102-1 and the first switchable filter 114-M for the second radio transceiver 102-N may be a complementary switchable filter pair. The second switchable filter 114-2 for the first radio transceiver 102-1 and the second switchable filter 114-M+1 for the second radio transceiver 102-N may be a complementary switchable filter pair. The third switchable filter 114-3 for the first radio transceiver 102-1 and the third switchable filter 114-N for the second radio transceiver 102-N may be a complementary switchable filter pair.

Switch 110-1 and switch 110-2 may be utilized to switch between, by enabling or disabling, the first switchable filter 114-1 for the first radio transceiver 102-1, the second switchable filter 114-2 for the first radio transceiver 102-1, and the third switchable filter 114-3 for the first radio transceiver 102-1. Switch 110-M and switch 110-N may be utilized to switch between the first switchable filter 114-M for the second radio transceiver 102-N, the second switchable filter 114-M+1 for the second radio transceiver 102-N, and the third switchable filter 114-N for the second radio transceiver 102-N.

The AP 100 is not intended to be limited to a particular example described herein. The AP 100 may include additional features and/or more perform additional operations such as those features and/or operations described with regard to the access point described in FIG. 1A, the machine-readable medium described in FIG. 2 and the method 340 described in FIG. 3

Figure 2:
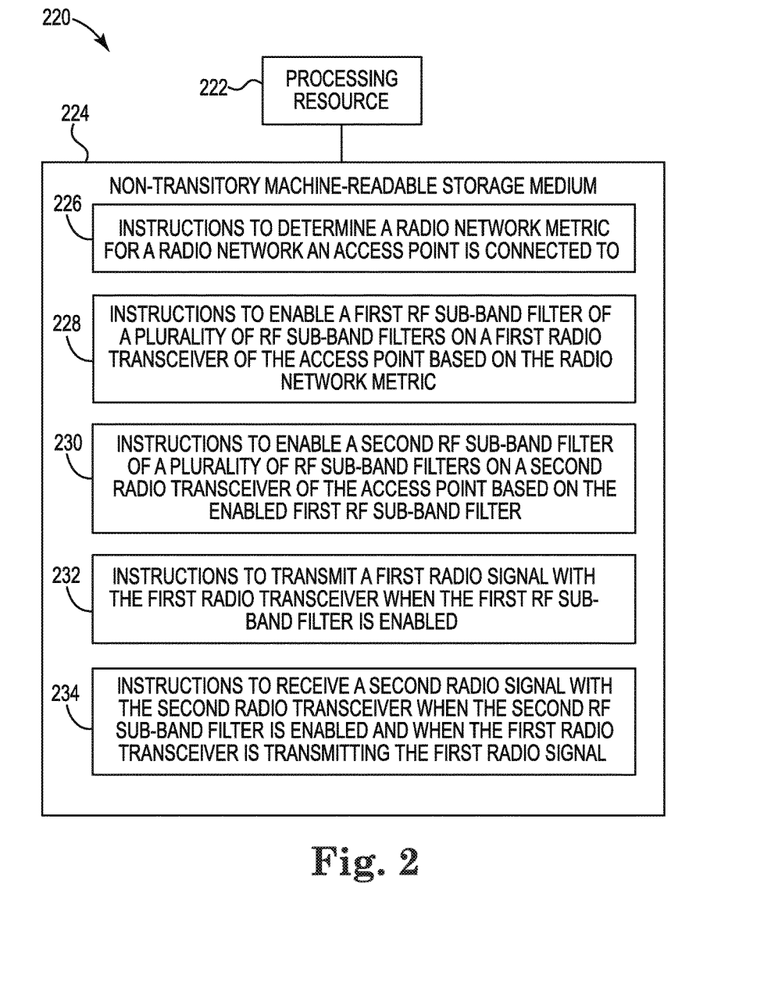
FIG. 2 illustrates a diagram of an example of a processing resource and a non-transitory machine-readable medium for utilizing transceiver filters consistent with the disclosure.

FIG. 2 illustrates a diagram 220 of a processing resource 222 and a non-transitory machine-readable medium 224 for transceiver filters, consistent with the disclosure. A memory resource, such as the non-transitory machine-readable medium 224, may be used to store instructions (e.g., 226, 228, 230, 232, 234) executed by the processing resource 222 to perform the operations as described herein. The operations are not limited to a particular example described herein and may include additional operations such as those described with regard to the AP 100 described in FIGS. 1A and 1B, and the method 340 described in FIG. 3.

A processing resource 222 may execute the instructions stored on the non-transitory machine readable medium 224. The non-transitory machine-readable medium 224 may be any type of volatile or non-volatile memory or storage, such as random-access memory (RAM), flash memory, read-only memory (ROM), storage volumes, a hard disk, or a combination thereof.

The machine-readable medium 224 may store instructions 226 executable by the processing resource 222 to determine, at an access point, a radio network metric. Determining a radio network metric may include determining a network metric. A network metric may include an indication of a past, present, or future performance conditions of the AP and/or the computing network that the AP is connected to. The network metric may include performance conditions of other APs in the network. The network metric may include the assigned transmission schedules and/or channel assignments of the AP and/or other APs in the network. The network metric may include metrics of the radio performance of the first radio transceiver on the AP and/or the radio performance of the second radio transceiver. The network metric may include signal strength metrics and/or signal path loss metrics for the AP and/or other APs in the network. The network metric may also include a current radio network load, such as a percentage of utilization of the bandwidth of the radio network overall and/or at particular APs of the network. The network metric may also include the signal degrading radio interference detected across the network and/or at particular APs of the network. The network metric may also include metrics of spectrum analysis, including determinations of which portions of the radio spectrum accessible by the AP are meeting threshold performance levels.

The radio network metric may be determined at the AP by measurements performed by the AP. The radio network metric may be determined, at least partially, by other APs and/or by a network controller or other network device. The network metric may be communicated to the AP from the other APs, network controller, or other network device.

As described in relation to FIG. 1, the AP may include a first radio transceiver and a second radio transceiver. The first radio transceiver and the second radio transceiver may be different types of radio transceivers. That is, the first radio transceiver and the second radio transceiver may transmit and/or receive different types of radio signals. For example, the first radio transceiver may transmit and/or receive Wi-Fi signals, while the second radio transceiver may transmit and/or receive a radio signal of a wireless personal area network (WPAN) utilizing an IEEE 802.15 technical standard. For example, the second radio transceiver may transmit and/or receive a IEEE 802.15.1/4 radio signal.

Additionally, the AP may include a bank of switchable filters on the first radio transceiver and a bank of switchable filters on the second radio transceiver. The switchable bank of filters may be controlled (e.g., individually enabled or disabled) by switches controlled by input from the processing resource 222. The switchable bank of filters may include complementary filters as described above. For example, a pair of complementary filters may include a RF sub-band filter in the first bank of switchable filters on the first radio transceiver and a second RF sub-band filter in the second bank of switchable filters on the second radio transceiver. The complementary pairs of switchable filters may include be complementary in that they filter out LNA/PA jamming and in-channel interference coming from the first radio transceiver from interfering with the second radio transceiver. That is, without filtering that restricts the radio frequency bandwidth and/or the channels that the first radio transceiver transmitting the first radio signal with the first radio transceiver creates jamming and/or on-channel interference with the second radio transceiver. The jamming and on-channel interference may prevent the second radio transceiver from receiving the second radio signal. The complementary filter pairs make act as bandpass filters for channels utilized by the first radio transceiver and channels that are utilized by the second radio transceiver that are spaced far enough apart on the radio frequency spectrum to attenuate the on-channel and jamming interference while still maintaining a strong and reliable ability to transmit and/or receive during simultaneous operation of the first and second radio transceivers. In doing so, the complementary filters may prevent the first radio transceiver and the second radio transceiver from transmitting and/or receiving their corresponding radio signals on filtered out channels that would otherwise be accessible and utilized by the first radio transceiver and the second radio transceiver.

Determining the network metric may include identifying potential complementary filter pairs on the first radio transceiver of and AP and the second radio transceiver of the AP, respectively. Determining the network metric may include determining and/or predicting changes in the network metrics that may be introduced by enabling particular complementary filter pairs. For example, determining the network metric may include determining whether enabling a first RF sub-band filter on a first radio transceiver of an AP and a second RF sub-band filter on a second radio transceiver of the AP increases a network performance metric.

The machine-readable medium 224 may store instructions 228 executable by the processing resource 222 to enable a first RF sub-band filter of a plurality of RF sub-band filters on a first radio transceiver of the access point. The first RF sub-band filter to be enabled may be selected based on the radio network metric. For example, the first RF sub-band filter to be enabled may be selected based on a channel that the access point is assigned to utilize in transmitting from the first radio transceiver. In some examples, the first RF sub-band filter to be enabled may be selected based on a signal strength that the first radio transceiver is achieving from a particular channel.

The machine-readable medium 224 may store instructions 230 executable by the processing resource 222 to enable a second RF sub-band filter of a plurality of RF sub-band filters on a second radio transceiver of the access point. The second RF sub-band filter to be enabled may be selected based on the enabled first RF sub-band filter. That is, the second RF sub-band filter may be selected to be enabled based on the second RF sub-band filter being complementary to the first RF sub-band filter selected to be enabled on the first transceiver radio. The second RF sub-band filter may be selected to be enabled based on the combination of an enable first RF sub-band filter and an enabled second RF sub-band providing a relatively highest amount of jamming and on-channel interference attenuation between the first radio transceiver and the second radio transceiver.

The machine-readable medium 224 may store instructions 232 executable by the processing resource 222 to transmit a first radio signal with the first radio transceiver while the first RF sub-band filter is enabled. As described above transmitting the first radio signal with the first radio transceiver may create on-channel interference with the second radio transceiver. This on-channel interference may prevent the second transceiver radio from receiving a second radio signal. However, enabling the first RF sub-band filter may attenuate on-channel interfering energy produced by the first radio transceiver produced during transmission of the first radio signal from interfering with the second radio transceiver receiving a corresponding second radio signal.

Enabling the first RF sub-band filter may include enabling a first RF sub-band filter that acts as a bandpass filter for a first portion of the channels that the unfiltered first radio transceiver may utilize to transmit a first radio signal. Additionally, the RF sub-band filter will filter out a second portion of the channels that the unfiltered first radio transceiver may utilize to transmit a first radio signal. That is, enabling the first RF sub-band filter may prevent the first radio transceiver from transmitting and/or receiving a first radio signal over a data channel that the first radio transceiver may transmit and/or receiver radio signals on when the first RF sub-band filter is disabled.

The machine-readable medium 224 may store instructions 234 executable by the processing resource 222 to receive a second radio signal with the second radio transceiver while the second RF sub-band filter is enabled and while the first radio transceiver is transmitting the first radio signal. As described above, transmitting, and amplifying, the first radio signal with the first radio transceiver may create jamming of the second radio transceiver. This jamming may prevent the second radio transceiver from receiving a second radio signal. However, enabling the second RF sub-band filter may attenuate jamming energy received by the second radio transceiver while the first radio transmitter is transmitting the first radio signal.

Enabling the second RF sub-band filter may include enabling a second RF sub-band that acts as a bandpass filter for a first portion of the channels that the unfiltered second radio transceiver may utilize to receive a second radio signal. Additionally, the RF sub-band filter will filter out a second portion of the channels that the unfiltered second radio transceiver may utilize to receive the second radio signal. That is, enabling the second RF sub-band filter may prevent the second radio transceiver from transmitting and/or receiving the second radio signal over a data channel that the second radio transceiver may transmit and/or receiver radio signals on when the second RF sub-band filter is disabled.

Figure 3:
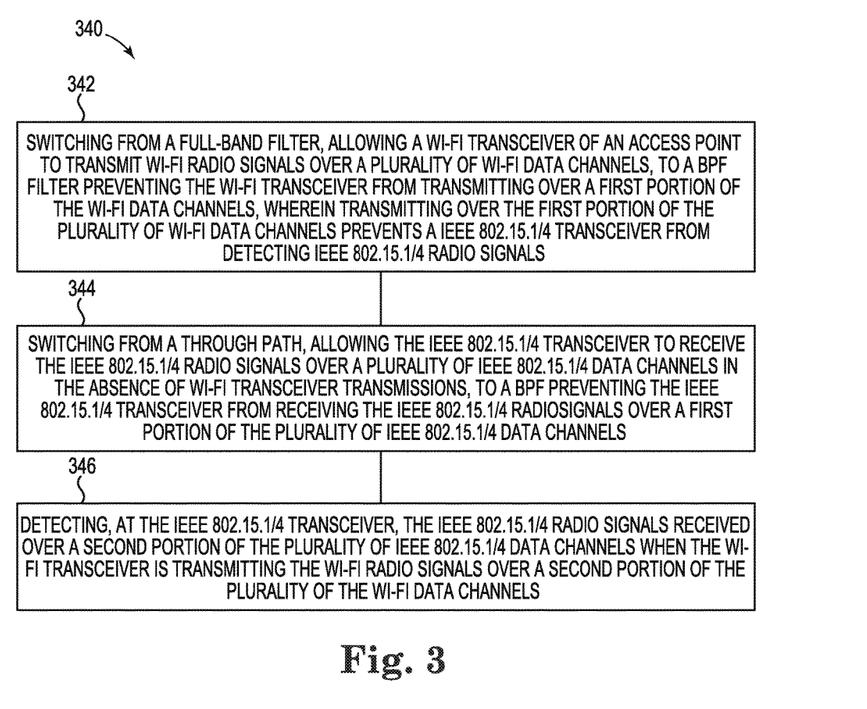
FIG. 3 illustrates a diagram of an example of a method for utilizing transceiver filters consistent with the disclosure.

FIG. 3 illustrates a diagram of a method 340 for transceiver filtering consistent with the disclosure. The method 340 is not limited to any particular set and/or order of operations. The method 340 may include additional operations such as those described with regard to the AP 100 described in FIGS. 1A and 1B, and the machine-readable medium 224 described in FIG. 2.

At 342, the method 340 may include switching between filters in a first bank of switchable filters on a first radio transceiver. For example, switching between filters may include switching from a full-band filter to a bandpass filter. The full-band filter may be a filter that allows a first radio transceiver, such as a Wi-Fi transceiver, to transmit a first radio signal, such as a Wi-Fi radio signal, over a plurality of data channels, such as Wi-Fi data channels. The plurality of data channels may be the entire amount of channels that the first radio transceiver may utilize to transmit and/or receive the first radio signal without any filtering. The bandpass filter may prevent the first radio transceiver from transmitting on a first portion of the plurality of data channels. For example, the bandpass filter may prevent a Wi-Fi transceiver from transmitting and/or receiving on a first portion of the plurality of Wi-Fi data channels.

In some examples, a second radio transceiver may be included in the same AP as the first radio transceiver. In such examples, transmitting on the first portion of the plurality of data channels with the first radio transceiver may generate and/or on-channel interference that prevents the second radio transceiver from detecting a second radio signal. For example, where the first radio transceiver is a Wi-Fi radio transceiver and the second radio transceiver is a IEEE 802.15.1/4 radio transceiver, transmitting over the first portion of the plurality of Wi-Fi data channels may prevent the IEEE 802.15.1/4 radio transceiver of the access point from detecting IEEE 802.15.1/4 radio signals.

At 344, the method 340 may include switching between filters in a second bank of switchable filters on the second radio transceiver. For example, the switching between filters may include switching from a through path to a bandpass filter. The throughput path may allow a second radio transceiver, such as an IEEE 802.15.1/4 receiver, over a plurality of data channels, such as IEEE 802.15.1/4 data channels. The plurality of data channels may be the entire amount of channels that the second radio transceiver may utilize to transmit and/or receive the second radio signal without any filtering. The bandpass filter may prevent the second radio transceiver from transmitting on a first portion of the plurality of data channels. For example, the bandpass filter may an IEEE 802.15.1/4 transceiver from transmitting and/or receiving on a first portion of the plurality of IEEE 802.15.1/4 data channels.

At 346, the method 340 may include detecting, at the second radio transceiver, the second radio signal received over a second portion of the plurality of data channels for the second radio transceiver that are allowed by the bandpass filter. For example, an IEEE 802.15.1/4 radio transceiver may detect an IEEE 802.15.1/4 radio signal received over a second portion of the plurality of IEEE 802.15.1/4 data channels. The second radio transceiver may detect the second radio signal while the first radio transceiver is transmitting the first radio signal over a second portion of the plurality of data channels for the first radio transceiver. For example, an IEEE 802.15.1/4 transceiver radio may detect IEEE 802.15.1/4 radio signals over a second portion of the plurality of IEEE 802.15.1/4 data channels while the Wi-Fi transceiver is transmitting the Wi-Fi radio signals over a second portion of the plurality of the Wi-Fi data channels.

Additionally, the method 340 may include switching, responsive to detecting the second radio transceiver is no longer receiving the second radio signals, from the bandpass filter preventing the first radio transceiver from transmitting the first radio signals on the first portion of the plurality of data-channels of the first radio transceiver back to the full-band filter. For example, responsive to a determination that radio signals specific to the second transceiver radio are no longer detected for longer than a threshold period of time, the bandpass filter on the first radio transceiver may be disabled and the full-band filter on the first radio transceiver may be enabled. In some examples, responsive to detecting that an IEEE 802.15.1/4 radio transceiver is no longer receiving IEEE 802.15.1/4 radio signals, a switch may be executed from the bandpass filter preventing the Wi-Fi transceiver from transmitting the Wi-Fi radio signals on the first portion of the plurality of Wi-Fi data channels back to the full-band filter that allows transmission and/or reception of Wi-Fi signals on all of the plurality of Wi-Fi data channels.

Similarly, responsive to detecting the second radio transceiver is no longer receiving the second radio signals, the bandpass filter preventing the second radio transceiver from receiving the second signals over the first portion of the plurality of data channels for the second radio transceiver may be switched to the through path. The through path may allow the second radio transceiver to receive the second signals over all the plurality of data channels of the second radio transceiver while the first radio transceiver is not transmitting. For example, responsive to detecting that an IEEE 802.15.1/4 radio transceiver is no longer receiving IEEE 802.15.1/4 radio signals, a switch may be made from the bandpass filter preventing the IEEE 802.15.1/4 transceiver from receiving the IEEE 802.15.1/4 radio signals over the first portion of the plurality of IEEE 802.15.1/4 data channels to the through path allowing the IEEE 802.15.1/4 transceiver to receive the IEEE 802.15.1/4 radio signals over the plurality of IEEE 802.15.1/4 data channels.

Additionally, the bandpass filter preventing the first radio transceiver from transmitting the first radio signals over the first portion of the plurality of data channels for the first radio transceiver may be switched to a second bandpass filter that prevents the first radio transceiver from transmitting the first radio signal over a third portion of the plurality of data channels for the first radio transceiver. For example, the bandpass filter preventing the Wi-Fi transceiver from transmitting the Wi-Fi radio signals over the first portion of the plurality of Wi-Fi data channels may be switched to a second bandpass filter that prevents the Wi-Fi transceiver from transmitting the Wi-Fi radio signals over a third portion of the plurality of Wi-Fi data channels.

Similarly, the bandpass filter preventing the second radio transceiver from receiving the second radio signal over the first portion of the plurality of data channels for the second radio transceiver may be switched to a second bandpass filter preventing the second radio transceiver from receiving the second radio signal over a third portion of the plurality of data channels for the second radio transceiver. For example, the bandpass filter preventing the IEEE 802.15.1/4 transceiver from receiving the IEEE 802.15.1/4 radio signals over the first portion of the plurality of IEEE 802.15.1/4 data channels may be switched to bandpass filter preventing the IEEE 802.15.1/4 transceiver from receiving the IEEE 802.15.1/4 radio signals over a third portion of the plurality of IEEE 802.15.1/4 data channels.

The second radio transceiver may be instructed to refrain from scanning channels that it is prevented from transmitting and/or receiving on. For example, the IEEE 802.15.1/4 radio transceiver may be instructed to refrain from scanning on a prevented IEEE 802.15.1/4 channel of the plurality of IEEE 802.15.1/4 channels.

The second radio transceiver may be utilized to track an asset by receiving a beacon including the second radio signal while the first radio transceiver is transmitting first radio signals over a second portion of the plurality of data channels for the first radio transceiver. For example, the IEEE 802.15.1/4 radio transceiver may be utilized to track an asset by receiving a IEEE 802.15.1/4 beacon from the asset when the Wi-Fi transceiver is transmitting the Wi-Fi radio signals over a second portion of the plurality of the Wi-Fi data channels In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a plurality of additional examples of the present disclosure. In addition, the proportion and the relative scale of the elements provided in the figures are intended to illustrate the examples of the present disclosure and should not be taken in a limiting sense.

What is claimed:

1. An access point, comprising:
   a processing source;
   a first radio transceiver;
   a first radio frequency (RF) sub-band filter on the first radio transceiver;
   a second radio transceiver;
   a second RF sub-band filter, complementary to the first RF sub-band filter, on the second radio transceiver; and
   instructions executable by the processing resource to enable or disable the first RF sub-band filter or the second RF sub-band filter based on a network metric,
   wherein the first radio transceiver prevents a radio signal receive operation of the second radio transceiver when the first radio transceiver is transmitting with a full-band filter and the first RF sub-band filter and the second RF sub-band filter are disabled.

2. The access point of claim 1, wherein the first radio transceiver is a Wi-Fi radio transceiver.

3. The access point of claim 2, wherein the Wi-Fi transceiver utilizes a 2.4 gigahertz ultra high frequency (UHF) radio band.

4. The access point of claim 1, wherein the second radio transceiver is a IEEE 802.15.1/4 radio transceiver.

5. The access point of claim 1, wherein the second radio transceiver is a wireless personal area network (WPAN) utilizing an IEEE 802.15 technical standard.

6. The access point of claim 1, wherein the radio signal receive operation of the second radio transceiver is not prevented when the first radio transceiver is transmitting and the first RF sub-band filter and the second RF sub-band filter are enabled.

7. The access point of claim 6, wherein the radio signal receive operation is not prevented on a first portion of a plurality of data channels that the second radio transceiver is configured to receive a radio signal on and wherein the radio signal receive operation remains prevented on a second portion of the plurality of data channels.

8. The access point of claim 1, wherein the first RF sub-band filter passes a first portion of a frequency band of a signal from the first radio transceiver and attenuates a second portion of the frequency band of the signal from the first radio transceiver, and wherein the second RF sub-band filter passes a first portion of a frequency band of a signal to the second radio transceiver and attenuates a second portion of the frequency band of the signal to the second radio transceiver.

9. The access point of claim 8, wherein the first RF sub-band filter is a band pass filter (BPF) for a portion of a plurality of data channels that the first radio transceiver is configured to transmit a radio signal over.

10. The access point of claim 8, wherein the second RF sub-band filter is a band pass filter (BPF) for a portion of a plurality of data channels that the second radio transceiver is configured to receive a radio signal over.

11. A method, comprising:
   switching from a full-band filter, allowing a Wi-Fi transceiver of an access point to transmit Wi-Fi radio signals over a plurality of Wi-Fi data channels, to a band pass filter (BPF), preventing the Wi-Fi transceiver from transmitting the Wi-Fi radio signals over a first portion of the plurality of Wi-Fi data channels, wherein transmitting over the first portion of the plurality of Wi-Fi data channels prevents a IEEE 802.15.1/4 transceiver of the access point from detecting IEEE 802.15.1/4 radio signals;
   switching from a through path, allowing the IEEE 802.15.1/4 transceiver to receive the IEEE 802.15.1/4 radio signals over a plurality of IEEE 802.15.1/4 data channels in the absence of Wi-Fi transceiver transmissions, to a BPF preventing the IEEE 802.15.1/4 transceiver from receiving the IEEE 802.15.1/4 radio signals over a first portion of the plurality of IEEE 802.15.1/4 data channels; and detecting, at the IEEE 802.15.1/4 transceiver, the IEEE 802.15.1/4 radio signals received over a second portion of the plurality of IEEE 802.15.1/4 data channels when the Wi-Fi transceiver is transmitting the Wi-Fi radio signals over a second portion of the plurality of the Wi-Fi data channels.

12. The method of claim 11, comprising tracking an asset by receiving a IEEE 802.15.1/4 beacon from the asset over the second portion of the plurality of IEEE 802.15.1/4 channels when the Wi-Fi transceiver is transmitting the Wi-Fi radio signals over a second portion of the plurality of the Wi-Fi data channels.

13. The method of claim 11, comprising:
switching, responsive to detecting the IEEE 802.15.1/4 transceiver is no longer receiving the IEEE 802.15.1/4 radio signals, from the BPF preventing the Wi-Fi transceiver from transmitting the Wi-Fi radio signals over the first portion of the plurality of Wi-Fi data channels to the full-band filter; and
switching from the BPF preventing the IEEE 802.15.1/4 transceiver from receiving the IEEE 802.15.1/4 radio signals over the first portion of the plurality of IEEE 802.15.1/4 data channels to the through path allowing the IEEE 802.15.1/4 transceiver to receive the IEEE 802.15.1/4 radio signals over the plurality of IEEE 802.15.1/4 data channels.

14. The method of claim 11, comprising:
switching from the BPF preventing the Wi-Fi transceiver from transmitting the Wi-Fi radio signals over the first portion of the plurality of Wi-Fi data channels to a BPF preventing the Wi-Fi transceiver from transmitting the Wi-Fi radio signals over a third portion of the plurality of Wi-Fi data channels; and
switching from the BPF preventing the IEEE 802.15.1/4 transceiver from receiving the IEEE 802.15.1/4 radio signals over the first portion of the plurality of IEEE 802.15.1/4 data channels to a BPF preventing the IEEE 802.15.1/4 transceiver from receiving the IEEE 802.15.1/4 radio signals over a third portion of the plurality of IEEE 802.15.1/4 data channels.

* * * * *

UNITED STATES PATENT AND TRADEMARK OFFICE
CERTIFICATE OF CORRECTION

| | | |
|---|---|---|
| PATENT NO. | : 10,439,655 B1 | Page 1 of 1 |
| APPLICATION NO. | : 15/938109 | |
| DATED | : October 8, 2019 | |
| INVENTOR(S) | : Farhan Hasnain et al. | |

It is certified that error appears in the above-identified patent and that said Letters Patent is hereby corrected as shown below:

On the Title Page

All inventor addresses list the state as "FL" but should be changed to "CA".

Signed and Sealed this
Twenty-eighth Day of April, 2020

Andrei Iancu
*Director of the United States Patent and Trademark Office*